United States Patent
Sugimoto

(10) Patent No.: US 8,463,143 B2
(45) Date of Patent: Jun. 11, 2013

(54) AMPLIFIER WITH OFFSET COMPENSATOR AND OPTICAL RECEIVER IMPLEMENTED WITH THE SAME

(75) Inventor: Yoshiyuki Sugimoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 215 days.

(21) Appl. No.: 13/166,580

(22) Filed: Jun. 22, 2011

(65) Prior Publication Data
US 2011/0318015 A1  Dec. 29, 2011

(30) Foreign Application Priority Data

Jun. 25, 2010  (JP) ................. 2010-145517

(51) Int. Cl.
*H04B 10/00* (2006.01)
(52) U.S. Cl.
USPC ........... 398/208; 398/209; 398/202; 330/250; 250/200
(58) Field of Classification Search
USPC ............... 398/202–214; 250/200; 330/250
See application file for complete search history.

(56) References Cited

U.S. PATENT DOCUMENTS

| | | | |
|---|---|---|---|
| 4,574,249 A * | 3/1986 | Williams | 330/59 |
| 6,064,507 A * | 5/2000 | Heflinger et al. | 359/237 |
| 6,069,534 A * | 5/2000 | Kobayashi | 330/308 |
| 6,307,660 B1 * | 10/2001 | Cordell et al. | 398/209 |
| 6,525,858 B1 * | 2/2003 | Nagahori | 398/208 |
| 6,590,455 B1 * | 7/2003 | Kobayashi | 330/308 |
| 6,639,473 B1 * | 10/2003 | Kobayashi | 330/308 |
| 6,710,915 B2 * | 3/2004 | Itoh | 359/333 |
| 6,771,132 B1 * | 8/2004 | Denoyer et al. | 330/308 |
| 6,778,021 B2 * | 8/2004 | Denoyer et al. | 330/308 |
| 6,832,054 B2 * | 12/2004 | Kim | 398/202 |
| 6,847,263 B2 * | 1/2005 | Denoyer et al. | 330/308 |
| 7,030,702 B2 * | 4/2006 | Denoyer et al. | 330/308 |
| 7,042,295 B2 * | 5/2006 | Guckenberger et al. | 330/308 |
| 7,335,872 B2 * | 2/2008 | Fukuda et al. | 250/214 A |
| 7,418,213 B2 * | 8/2008 | Denoyer | 398/210 |
| 7,442,913 B2 * | 10/2008 | Fukuda et al. | 250/214 A |
| 7,525,391 B2 * | 4/2009 | Denoyer | 330/308 |
| 2011/0318015 A1 * | 12/2011 | Sugimoto | 398/116 |
| 2012/0121273 A1 * | 5/2012 | Ito et al. | 398/202 |

FOREIGN PATENT DOCUMENTS

| | | |
|---|---|---|
| JP | 2003-168933 | 6/2003 |
| JP | 2004-336568 | 11/2004 |

* cited by examiner

*Primary Examiner* — Agustin Bello
(74) *Attorney, Agent, or Firm* — Venable LLP; Michael A. Sartori

(57) ABSTRACT

An amplifier for an optical receiver is disclosed. The amplifier includes a common base buffer, a differential amplifier, and some buffer amplifiers, where circuit block from the common base buffer to the buffer amplifiers have the differential arrangement and are connected in series in this order. The amplifier further includes an offset compensator that receives the outputs of the buffer amplifier put in the rear end of the amplifier and outputs control signals, which are complementary to each other and filtered by a low-pass-filter, to the base of the transistors in the common base buffer to compensate the offset appeared in the output of the buffer amplifier.

8 Claims, 6 Drawing Sheets

AMPLIFIER WITH OFFSET COMPENSATOR AND OPTICAL RECEIVER IMPLEMENTED WITH THE SAME

BACKGROUND OF THE INVENTION

1. Field of the Invention

The present invention relates to an amplifier circuit, in particular, the invention relates to an amplifier with an offset compensator.

2. Related Background Art

An amplifier has been well known in which the amplifier converts a current signal into a voltage signal by the differential mode. The Japanese Patent Application published as JP-2003-168933A has disclosed one type of an optical receiver circuit with a function to reduce an offset between signals complementary to the others. Another Japanese Patent Application published as JP-2004-336568A has disclosed an optical receiver including a transistor with the base-grounded arrangement.

SUMMARY OF THE INVENTION

A conventional amplifier with the function to compensate the offset has a subject to shift the operating point, in other words, the bias level of the differential amplifier. Accordingly, the conventional amplifier is unavoidable to narrow a range where the amplifier may linearly operate.

One aspect of the present invention relates to an amplifier that comprises a common base buffer, a differential amplifier and an offset compensator. The common base buffer includes a pair of transistors each having a control electrode and is configured with the base-grounded or the gate-grounded arrangement. The differential amplifier amplifies the output of the common base buffer differentially. The offset compensator, by receiving the outputs of the differential amplifier, generates control signals and provides them to control electrode of the transistors in the common base buffer negatively in the phase thereof.

Because the amplifier of the present invention may provide the common base buffer with the base-grounded transistors, and the outputs of the differential amplifier are negatively fed-back to the base of the base-grounded transistors; the offset inherently accompanied with the outputs of the differential amplifier may be compensated without affecting the linearly operable range of the outputs of the differential amplifier. The offset compensator may provide a low-pass filter in at least one of the input and the output thereof to drive the base of the base-grounded transistor in substantially DC mode.

Another aspect of the present invention relates to an optical receiver that includes an optical hybrid and an optical transducer. The optical hybrid may mix an optical input signal with an optical local signal to generate an in-phase element and a quadrature element of the optical input signal. The optical transducer may convert one of the in-phase and quadrature elements output from the optical hybrid into an electrical signal. The optical transducer of the invention may have the differential arrangement operable to a positive component and a negative component complementary to the positive component.

In one of the embodiments of the invention, the optical transducer may include a PD for receiving the in-phase or quadarature element, a common base buffer, and amplifier for outputting the electrical signal, and an offset compensator. The common base buffer has a base-grounded transistor that receives the output of the PD in the emitter thereof and outputting a signal in the collector thereof. The offset compensator may feedback the electrical signal output from the optical amplifier negatively to the base of the base-grounded transistor in the common base buffer.

Because the offset appeared in the outputs of the amplifier may be compensated by the common base buffer, specifically, by driving the base of the base-grounded transistor negatively to the output of the amplifier, the linearly operable range of the amplifier is substantially maintained even when the optical hybrid and the PDs inherently show large discrepancy in the performance thereof.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

A comparable amplifier will be described first for comparing to embodiments according to the present invention. In an optical communication system implemented with the digital coherent technology, an optical circuit, which is often called as the optical hybrid, put in the front end of the optical-to-electrical convert including a photodiode (hereafter denoted as PD) and a trans-impedance amplifier (hereafter denoted as TIA) to convert a phase modulate optical signal into an intensity modulated signal. The optical hybrid may output two optical signals, that is, a positive component Pin and a negative component /Pin, complementary to each other. The slash "/" added to the negative component means the inverting the phase thereof. Two PDs connected in parallel to the other may receive these two optical signals, respective outputs of which are received by the TIA with the differential mode, to enhance the signal-to-noise ratio (S/N).

Figure 1:
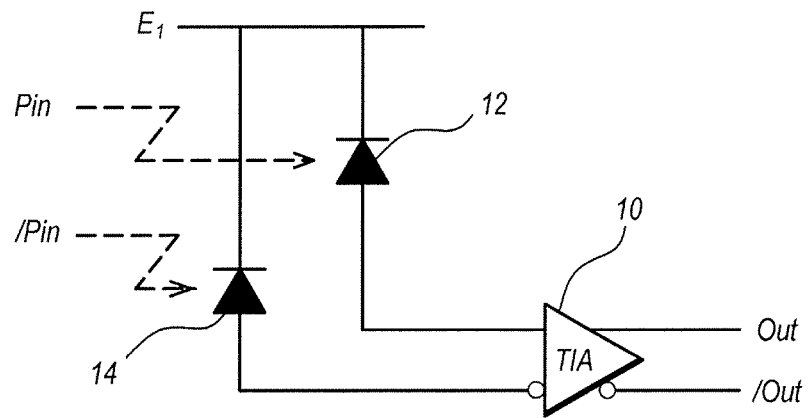
FIG. 1 is a block diagram of a conventional TIA.

FIG. 1 is a circuit diagram of the differential TIA 10 according to a comparable example. Respective inputs of the TIA 10 are coupled with PDs, 12 and 14, put in parallel to each other. The PDs, 12 and 14, in the cathodes thereof, are connected to the common bias $E_1$ and receive optical signals, Pin and /Pin, complementary to each other. The TIA 10 outputs signals, Out and /Out, which are also complementary to each other. Because of, for instance, unbalanced optical inputs of Pin and /Pin, unbalanced device performance of PDs, 12 and 14, and so on, the offset between two outputs, Out and /Out, sometimes becomes unacceptable.

Figure 2:
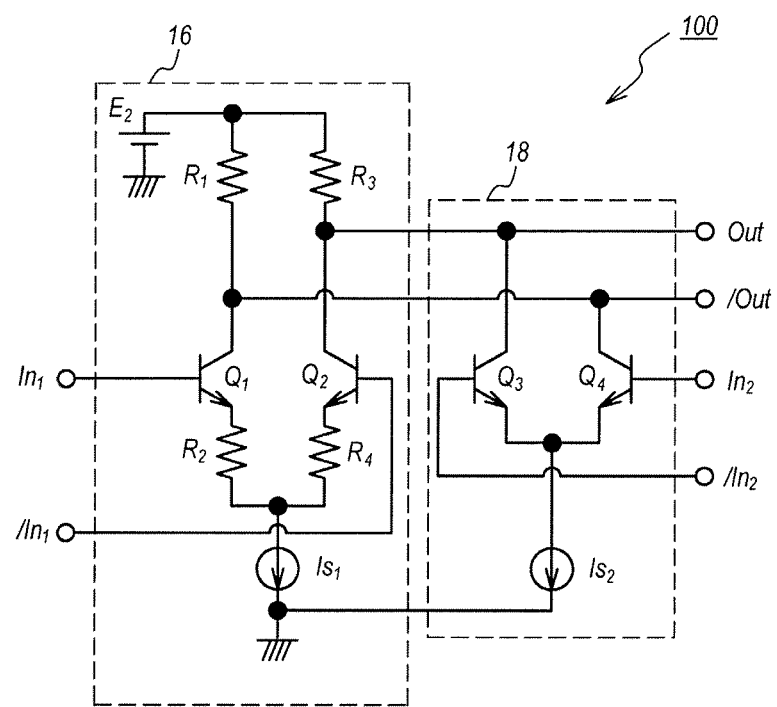
FIG. 2 is a circuit diagram of an amplifier with a function to compensate an offset.

An example to compensate the offset will be described. FIG. 2 is a circuit diagram of an amplifier 100 with the offset compensator. The amplifier 100 includes a differential circuit 16, two input terminals, $In_1$ to $/In_2$, two output terminals, Out and /Out, and an offset compensator 18. The differential circuit 16 includes two transistors, $Q_1$ and $Q_2$, four resistors, $R_1$ to $R_4$, and a current source $Is_1$. The offset compensator 18 includes two transistors, $Q_3$ and $Q_4$, and a current source $Is_2$.

For the transistor $Q_1$, the base is connected to the input terminal $In_1$, the emitter is connected to the current source $Is_1$ through the resistor $R_2$, and the collector is connected to the common bias $E_2$ through the resistor $R_1$. While, for the transistor $Q_2$, the base is connected to the other input terminal $/In_1$, the emitter is connected to the current source $Is_1$ through the resistor $R_4$, and the collector is connected to the bias $E_2$ through the resistor $R_3$. One terminal of the current source $Is_1$ is grounded.

In the offset compensator 18, the transistor $Q_3$ is connected to the other input terminal $/In_2$, the current source $Is_2$, and one of the output terminal Out, for the base, the emitter and the collector thereof, respectively. While, the transistor $Q_4$ is connected to the other input terminal, the current source $Is_2$, and the other output terminal /Out, for the base, the emitter and the collector thereof, respectively.

Two input terminals, $In_1$ and $/In_1$, receive the signals complementary to the others; while, two output terminals, Out and /Out, output amplified signals also complementary to the others. The other pair of input terminals, $In_1$ and $/In_2$, are differentially connected to the offset detector, which is not illustrated in FIG. 2. The offset adjusting signals provided to the input terminals, $In_1$ and $/In_2$, operate such that the offset between two output terminals, Out and /Out, becomes minimum. However, when the offset between two input terminals, $In_1$ and $/In_1$, is large, the input bias level, which is a halfway between two inputs shifts beyond the adjustable level.

Figure 3:
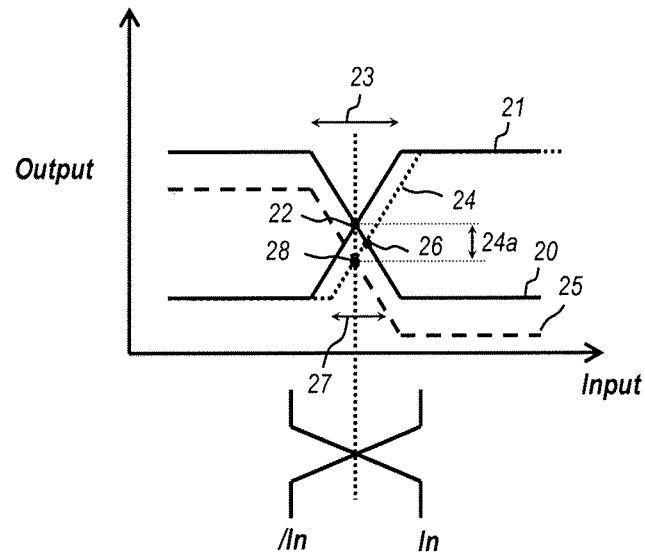
FIG. 3 shows output behaviors of the conventional amplifier shown in FIG. 1 which responds to the input signals complementary to the other.

A mechanism to compensate the offset will be described as referring to FIG. 3 that shows transfer curves between the input and the output of the differential amplifier 16. Solid lines, 20 and 21, denote the transfer curves without any offset between the outputs thereof, where the outputs, Out and /Out, become symmetrical against the inputs, In and /In, by the cross point 22 as the center and the linearly operable range is given by a range denoted by the arrow 23. Assuming a case where the output 21 causes an offset; that is, the output 21 shifts to a dotted line 24 and a substantial difference 24a appears between the outputs, 20 and 24, even two inputs, In and /In, is set in the same level which corresponds to the cross point of the inputs. The offset compensator 18 operates so as to shift the output 20 to a compensated output 25 to cancel the offset 24a.

This is carried out such that, when the output 24 corresponds to the terminal /Out, the other transistor $Q_3$ connected to the output terminal Out is biased to cause an additional current flowing therein and the collector level thereof is lowered by this additional current. Accordingly, the cross point between two compensated outputs, 24 and 25, shifts to the point 28, and the linearly operable range is changed to the range denoted by the arrow 27, which is narrower than the ideal case, or the situation where the offset is substantially ignorable. Moreover, as shown in FIG. 3, two outputs, 24 and 25, become asymmetry around the cross point 28. The offset compensator 18 further operates to cause a current also in the other transistor $Q_4$ to lower the output level thereof so as to make the output symmetrical with respect to the cross point 28. In such a case, the linearly operable range 27 becomes further narrower.

Thus, the offset compensator 18 provided in the downstream of the differential circuit 16 narrows the linearly operable range. This range is one of the most important factors in the optical receiver for the digital coherent circuit; accordingly, the amplifier 100 shown in FIG. 2 is inadequate for the digital coherent application.

Next, preferred embodiments according to the present invention will be described as referring to accompanying drawings.

First Embodiment

Figure 4:
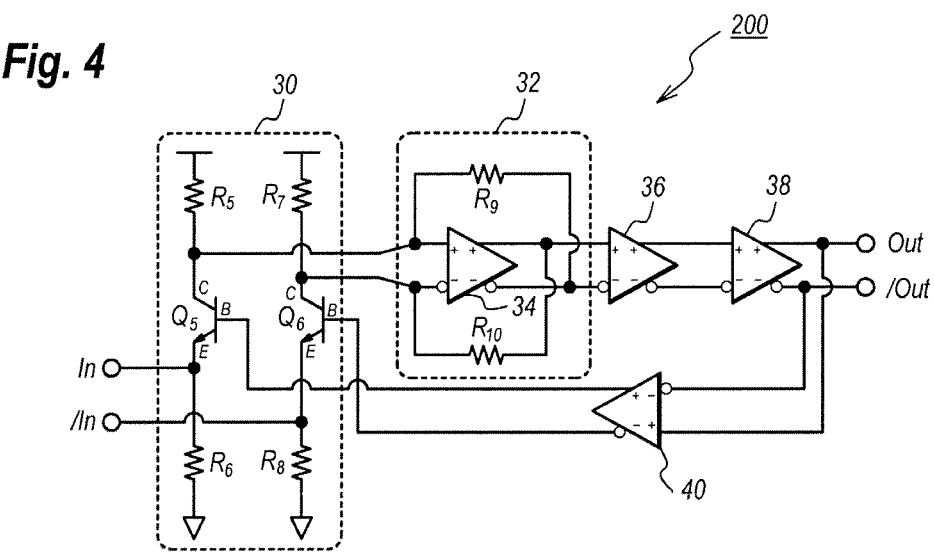
FIG. 4 is a diagram of an amplifier according to the first embodiment of the invention.

FIG. 4 is a block diagram of an amplifier 200 according to the first embodiment of the present invention. The amplifier 200 includes two input terminals, In and /In, a common base buffer 30 with the common base arrangement, a trans-impedance amplifier 32, output buffer amplifiers, 36 and 38, an offset compensator 40, and two output terminals, Out and /Out. The input terminals, In and /In, receive signals complementary to the others. The common base buffer 30 includes two transistor, $Q_5$ and $Q_6$, and four resistors, $R_5$ to $R_8$. The emitter E of respective transistors, $Q_5$ and $Q_6$, receives the input signals, In and /In, and is grounded through the resistor, $R_6$ and $R_8$. The collector C is connected to the respective inputs of the TIA 32 and biased by the power supply through the resistor, $R_5$ and $R_7$. The base B is connected to the offset compensator 40 to receive an offset control signals therefrom.

The TIA 32 includes an amplifier 34 and two trans-impedance elements, $R_9$ and $R_{10}$, which are a pure resistor in the present embodiment. The inputs of the amplifier 34 are connected to the collector of respective transistors, $Q_5$ and $Q_6$, to receive outputs therefrom. The resistor $R_9$ is put between the non-inverting input and the inverting output of the amplifier 34, while the other resistor $R_{10}$ is put between the inverting input and the non-inverting input of the amplifier 34. The first buffer amplifier 36 and the second buffer amplifier 38 amplify the outputs of the amplifier 34 to output amplified signals, which are also complementary to the others, from the output terminals, Out and /Out. Configuring the second buffer amplifier 38 as a limiter amplifier, the circuit 200 may output signals with the rectangular shape.

The offset compensator 40 may be a differential amplifier to generate control signals based on the output of the second buffer 38. The control signals are guided to the base of the input transistors, $Q_5$ and $Q_6$. Because the offset only includes low frequency components or it is a substantially DC offset, the base B of respective transistors, $Q_5$ and $Q_6$, may be grounded in the AC mode.

As already described, the amplifier 200 of the present embodiment includes the common base buffer 30 in the upstream of the amplifier 32 to compensate the offset by the control signal output from the offset compensator 40. While, the comparative amplifier 100 shown in FIG. 2 compensates the offset by the offset compensator 18 set downstream of the differential amplifier 16, which affects the output levels of the amplifier 100. The amplifier 200 of the present embodiment may compensate the offset without affecting the output level thereof. The offset of the amplifier 34 may be compensated by adjusting the collector current flowing in the transistors, $Q_5$ and $Q_6$, in the common base buffer 30.

When the amplifier 200 receives the output from the PD in the input terminals thereof, In and /In, the bias for those PDs is determined by the emitter level of the transistors, $Q_5$ and $Q_6$, the configuration of which may stabilize the bias applied to the PD.

The embodiment shown in FIG. 4 concentrates on a case where the common base buffer 30 includes two bipolar transistors, $Q_5$ and $Q_6$. However, the invention is not restricted to those embodiments; and field effect transistors (FET) may be replaced to the bipolar transistors, $Q_5$ and $Q_6$, to receive control signals in the gate thereof. The source of the FET may receive the input signal, while, the drain may output the signal to the amplifier 34. Moreover, the embodiment shown in FIG. 4 applies the TIA 32 in the downstream stage of the common base buffer 30. But any other type of amplifiers may by applicable for the TIA 32.

Second Embodiment

Figure 5:
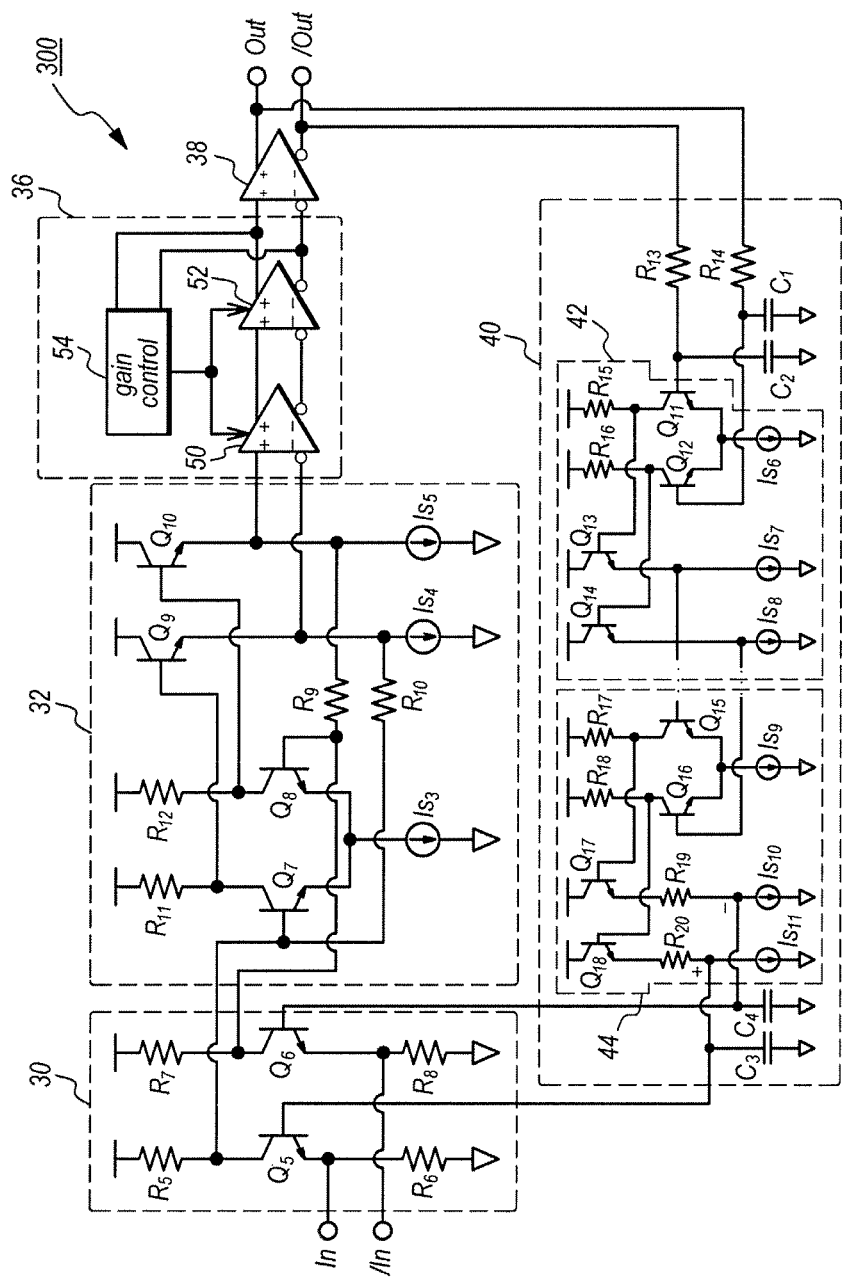
FIG. 5 is a diagram of another amplifier according to the second embodiment of the invention.

Another amplifier according to the second embodiment of the present invention will be described. FIG. 5 is a circuit diagram of the amplifier 300 according to the second embodiment, in which FIG. 5 discloses one specific circuit of the differential amplifier 32, the first buffer amplifier 36, and the offset compensator 40, all of which are included in the amplifier 200 shown in FIG. 4. In FIG. 5, the same circuit elements are referred by the same numerals or the symbols. Description presented below concentrates on differences from those shown in FIG. 4.

The amplifier 300 includes two input terminals, In and /In, the common base buffer 30, the differential amplifier 32, the first and second buffer amplifiers, 36 and 38, two output terminals, Out and /Out, and the offset compensator 40.

The amplifier 32 comprises a differential circuit including two transistors, $Q_7$ and $Q_8$, two resistors, $R_{11}$ and $R_{12}$, and a current source $Is_3$; an emitter follower including two transistors, $Q_9$ and $Q_{10}$, and two current sources, $Is_4$ and $Is_5$; and two feedback resistors, $R_9$ and $R_{10}$. In the transistor $Q_7$, the base receives the positive output of the common base buffer 30; the emitter couples with the current source $Is_3$; and the collector couples with the power supply through the load resistor $R_{11}$. While for the other transistor $Q_8$, the base thereof receives the negative output of the common base buffer 30; the emitter also couples with the current source $Is_3$; and the collector couples with the power supply through the other load resistor $R_{12}$. For the transistor $Q_9$ in the emitter follower, the base thereof receives the collector output of the transistor $Q_7$; the emitter is fed back to the base of the transistor $Q_7$ through the feedback resistor $R_{10}$ and couples with the current source $Is_4$; and the collector directly couples with the power supply. For the other transistor $Q_{10}$ in the emitter follower, the base thereof receives the collector output of the transistor $Q_9$, the emitter is fed back to the base of the transistor $Q_9$ through the other feedback resistor $R_9$ and couples with the current source $Is_5$; and the collector directly couples with the power supply.

The first buffer amplifier 36 includes two differential amplifiers, 50 and 52, coupled in series to each other and a gain controller 54 that controls the gain of two differential amplifiers, 50 and 52.

The offset compensator 40 has an arrangement including a plurality of differential amplifiers connected in series to each other, where FIG. 5 only illustrates two differential amplifiers, 42 and 44. The offset compensator 40 further comprises a filter including two capacitors, $C_1$ and $C_2$, and two resistors, $R_{13}$ and $R_{14}$, in the front end thereof. The filter is a type of the low pass filter that integrates the output of the second buffer amplifier 38. The offset compensator 40 may amplify low frequency components, or substantially the DC component of the output of the second buffer amplifier 38 to generate the offset control signal provided to the base of the transistors, $Q_5$ and $Q_6$, in the common base buffer 30.

The first differential amplifier 42 in the offset compensator 40 includes four transistors, $Q_{11}$ to $Q_{14}$, two resistors, $R_{15}$ and $R_{16}$, and three current sources, $Is_6$ to $Is_8$. The circuit of the second differential amplifier 42 has an arrangement same as those of the differential amplifier 32 except that the differential amplifier 42 in the offset compensator 40 excludes two feedback resistors. The other differential amplifier 44 also has an arrangement same as those of the first differential amplifier 42 except that the emitter follower provides two resistors, $R_{19}$ and $R_{20}$, each put between the transistor, $Q_{17}$ or $Q_{18}$, and the current source, $Is_{10}$ or $Is_{11}$.

The output of the second differential amplifier 44, which is brought from the node between the resistor, $R_{19}$ or $R_{20}$, and the current source, $Is_{10}$ or $Is_{11}$, is bypassed to the ground by the capacitors, $C_3$ and $C_4$, which may ground the output of the offset compensator 40, or the base of the transistors, $Q_5$ and $Q_6$, in the common base buffer 30, in the AC mode cooperating with the resistor, $R_{19}$ and $R_{20}$. Thus, the base of the transistors, $Q_5$ and $Q_6$, in the common base buffer 30 may be further stabilized.

Figure 6:
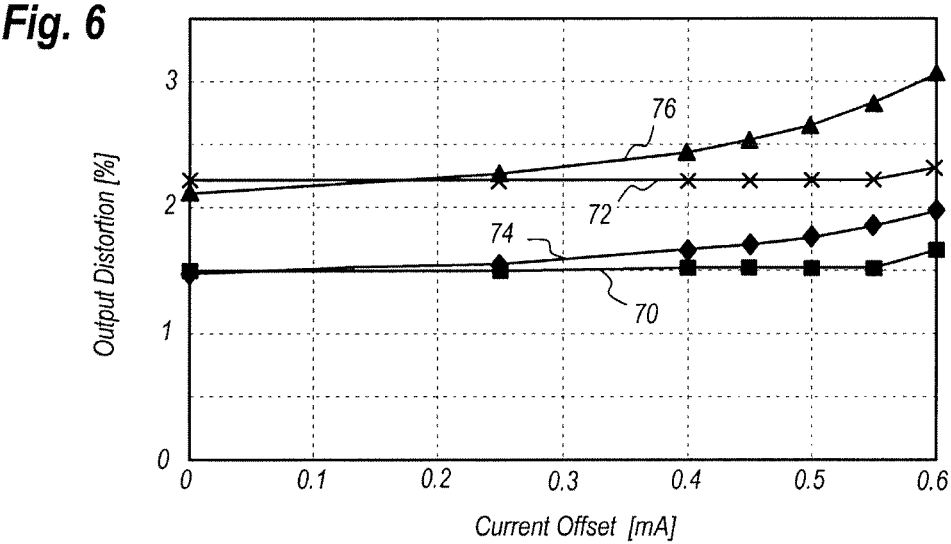
FIG. 6 shows simulated behaviors of the output distortion against the input offset.

FIG. 6 shows a result of the offset compensator 40. FIG. 6 shows the distortion of the output of the amplifier 300 against the offset current input thereto. Behaviors, 70 and 72 in FIG. 6 correspond to the output of the amplifier 300; while, other behaviors, 74 and 76, correspond to the output according to the comparative amplifier 400 show in FIG. 7, whose arrangement will be described later. Moreover, behaviors, 70 and 74, are result when the input currents complementary to the others have magnitude of 600 μA in peak-to-peak; while, the behaviors, 72 and 76, are the results when the input currents have magnitude of 1 mA in peak-to-peak.

For the comparative amplifier 400, the distortion in the outputs increase as the input offset currents increase as shown in behaviors, 74 and 76. On the other hand, for the amplifier 300 of the present embodiment, the increase of the distortion in the output thereof is suppressed compared to those of the comparative amplifier 400. In the digital coherent optical communication, the input offset current is assumed to be 0.4 to 0.5 mA. The amplifier 300 of the present embodiment may suppress the output distortion for those offset currents.

Figure 7:
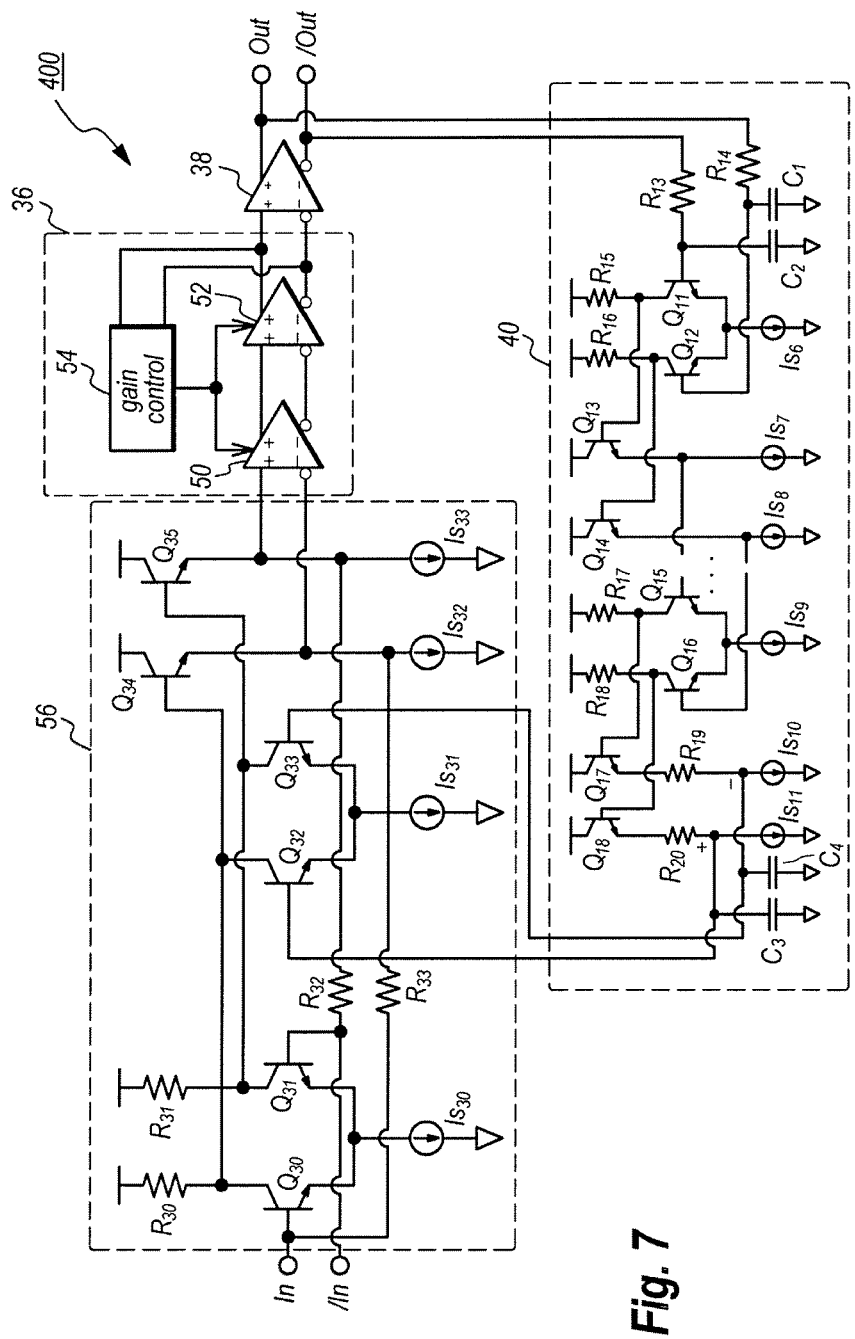
FIG. 7 is a diagram of an amplifier with the conventional arrangement.

The amplifier 400 according to the comparative example will be described as referring to FIG. 7, where the elements same with those appeared in FIG. 5 are referred by the same symbols without overlapping descriptions. The amplifier 400 also includes two input terminals, In and /In, the differential amplifier 56, first buffer amplifier 36, the second buffer amplifier 38, the offset compensator 40 and two output terminals, Out and /Out, but excludes the common base buffer 30. The offset compensator 40 generates the offset control signal but provides them to the paired transistors, $Q_{32}$ and $Q_{33}$, in the differential amplifier 56 same as those of the arrangement shown in FIG. 2.

The amplifier 400 does not have the common base buffer 30, and the offset may be compensated within the differential amplifier 56; exactly, the offset may be compensated at the output of the amplifying stage of the differential amplifier. Accordingly, the differential amplifier 56 shifts the cross point of the output signal thereof, which narrows the range where the amplifier 56 may linearly operate. On the other hand, because the amplifier 300 according to the second embodiment of the invention has the common base buffer 30 in the front end thereof, and the offset compensator 40 outputs the control signals to the base of the transistors in the common base buffer 30, which does not affect the bias level of the differential amplifier 32 connected in the downstream of the common base buffer 30 and the linearly operable range of the amplifier 32 may be substantially maintained.

Moreover, when the amplifier 400 receives the output of the PDs each connected to the input terminals, In and /In, the frequency bandwidth of the amplifier 300 depends on the sum of the input capacitance of the amplifier 300 and the junction capacitance of the PDs. The input capacitance of the amplifier 300 includes the junction capacitance of the transistors, $Q_{30}$ and $Q_{31}$, which is the base-emitter junction, and the miller capacitance between the base and the collector, which is enhanced by the gain of the transistor; accordingly, the input capacitance of the amplifier 300 becomes substantial. On the other hand, the base-emitter junction of the transistors, $Q_5$ and $Q_6$, in the common base buffer 30 is also positively biased, but the miller capacitance between the emitter and the collector is substantially ignorable; accordingly, the frequency bandwidth of the amplifier 300 of the present embodiment substantially depends only on the junction capacitance of the PDs connected to the input terminals, In and /In.

Third Embodiment

A digital coherent receiver using the amplifier according to the present invention will be described as referring to FIG. 8, which is a block diagram of the digital coherent receiver 500 applicable to, for instance, Dual Polarization Quadrature Phase Shift Keying (DP-QPSK) algorithm.

The receiver 500 includes an input terminal 90, a polarization beam splitter (PBS) 91, a local oscillator (LO) 92, an optical hybrid 93, four transducers, 93a to 93d, four analog-to-digital converters (A/D-C), 94a to 94d, a digital signal processor 98, and an output terminal 99. Each of transducers, 93a to 93d, includes two PDs, 80a and 81a, 80b and 81b, 82a and 82b, or, 83a and 83b; a common base buffer, 82a to 82d; a differential amplifier, 83a to 83d, two buffer amplifiers, 84a and 85a, 84b and 85b, 84c and 85c, or, 84d and 85d; and offset compensator, 86a to 86d. The arrangement of each transducers, 93a to 93d, is substantially identical with an arrangement of the amplifier, 200 or 300, with two PDs connected to respective input terminals, In and /In. Thus, the transducers, 93a to 93d, may compensate the degradation of the linearly operable range of the differential amplifier.

An optical input signal provided to the input terminal 90 is divided by the PBS 91 into the X-polarization beam and the Y-polarization beam. Each of the polarized beam enters the optical hybrid 93, is mixed with the local optical beam generated in the LO 92, and output therefrom as two in-phase elements, X-I and Y-I, and two quadrature elements, X-Q and Y-Q. Total four (4) beams each has the positive component and the negative component; for instance, $X-I_P$ denotes the positive component of the in-phase element of the X-polarization beam. Each of the transducers, 93a to 93d, receives one of elements, X-I, X-Q, Y-I or Y-Q, converts it into two electrical signals complementary to the others to output the electrical signals to the A/D-Cs. 94a to 94d. The A/D-Cs, 94a to 94d, convert the analog signals each output from the transducers, 93a to 93d, into a digital signal; then, the DSP 98 carries out the preset processes for the digital signals, and the result of the processing is provided in the output terminal 99.

Figure 8:
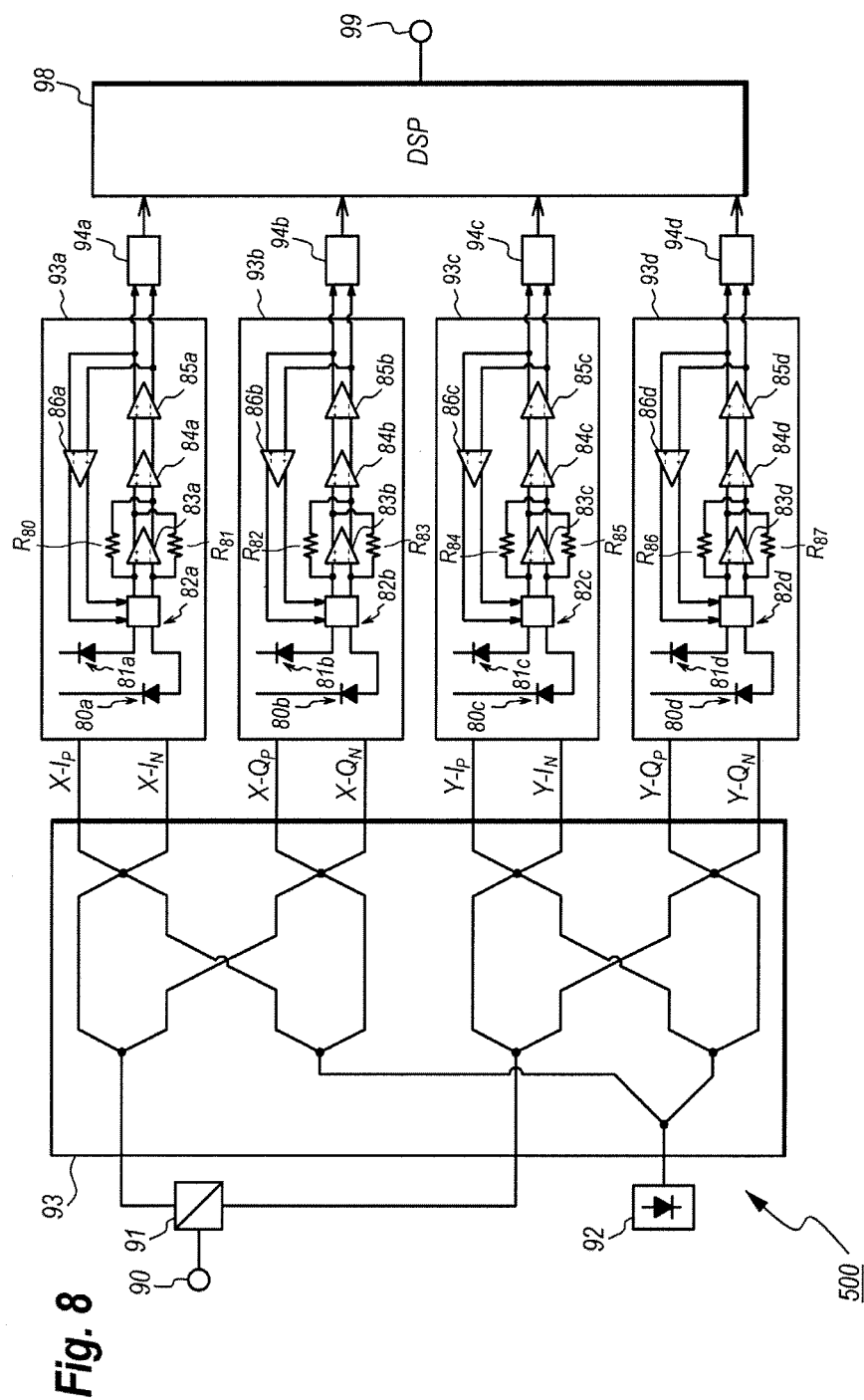
FIG. 8 is a block diagram of a digital coherent receiver able to implement with the TIA of the present invention.

Thus, the digital coherent receiver 500 shown in FIG. 8 receives an optical signal whose phase reflects a data stream, that is, the in-phase element corresponds to one data stream and the quadrature element corresponds to the other data stream. Moreover, respective polarizations, X and Y, may include those two data streams; accordingly, the DP-QPSK algorithm may increase the transmission capacity by four times greater than a conventional optical communication. However, because the optical hybrid 93 has dispersion in the performance thereof, two electrical signals entering the transducer, 93a to 93d, inherently show the offset. Moreover, respective PDs, 80a to 81d, also show a scattering in the performance thereof including the conversion efficiency and so on, the offset appearing at the output of the optical hybrid 93 is often enhanced. The common base buffers, 82a to 82d, provided in the front end of the transducer, 93a to 93d, in the present embodiment may compensate the offset without varying the output level of the differential amplifier, 83a to 83d, in the downstream of the common base buffer, 82a to 82d; accordingly, the linearly operable range of the differential amplifier, 83a to 83d, may be substantially kept.

In the foregoing detailed description, the circuit and the apparatus of the present invention have been described with reference to specific exemplary embodiments thereof. It will, however, be evident that various modifications and changes may be made thereto without departing from the broader spirit and scope of the present invention. For instance, the common base buffer 30 includes a pair of bipolar transistor to compensate the offset, but the bipolar transistor may be replaced with a field effect transistor (FET), where the control signal output from the offset compensator 40 drives the gate of the FET. In such cases, the base or the gate of the transistor may be called as the control electrode, while, the collector or the drain, and the emitter or the source are called as the current electrode. The present specification and figures are accordingly to be regarded as illustrative rather than restrictive.

What is claimed is:

1. An amplifier for an optical receiver, comprising:
a common base buffer including a pair of transistors each having a control electrode, said transistors having a base-grounded or a gate-grounded arrangement;
a differential amplifier for amplifying outputs of said common base buffer, said outputs being complementary to each other; and
an offset compensator for receiving outputs of said differential amplifier and generating control signals each provided to said control electrode of said transistors.

2. The amplifier of claim 1,
wherein said offset compensator includes a low-pass filter to integrate said control signals.

3. The amplifier of claim 2,
wherein said low-pass filter is put in an input of said offset controller.

4. The amplifier of claim 2,
wherein said low-pass filter is put in an output of said offset controller.

5. The amplifier of claim 1,
further comprising a pair of photodiodes each connected to one of current electrodes of said transistor in said common base buffer.

6. An optical receiver comprising:
an optical hybrid to merge an input optical beam with a local beam coming from an local oscillator to generate an in-phase element of said input optical beam and a quadrature element of said input optical beams, wherein said in-phase element and said quadrature element each having a positive component and a negative component complementary to said positive component; and
a optical transducer to receive one of said in-phase element and said quadrature element, said optical transducer including,
a first photodiode for receiving said positive component and generating a positive photocurrent,
a second photodiode for receiving said negative component and generating a negative photocurrent,
a common base buffer including two transistors each configured with a base-grounded arrangement, one of said transistors receiving said positive photocurrent in an emitter and outputting a positive signal in a collector thereof, another transistor receiving said negative photocurrent in an emitter and outputting a negative signal in a collector thereof, a differential amplifier for receiving said positive and negative signals of said common base buffer and generating a positive output and a negative output complementary to said positive output, and an offset compensator for receiving said positive and negative outputs, said offset compensator generating a positive control signal and a negative control signal each negatively fed-back to respective base of said transistors in said common base buffer.

7. An optical receiver comprising:

an optical hybrid for mixing an optical input signal with an optical local signal to generate an in-phase element and a quadrature element of said optical input signal; and an optical transducer for converting one of said in-phase and quadrature elements of said optical input signal to an electrical signal, said optical transducer having a differential arrangement operable of a positive component and a negative component complementary to said positive component, wherein said optical transducer including a photodiode for receiving said in-phase element or said quadrature element, a common base buffer, an amplifier for outputting said electrical signal, and an offset compensator, wherein said common base buffer has a base-grounded transistor for receiving an output of said photodiode in an emitter thereof and outputting a voltage signal in a collector thereof, and wherein said offset compensator feedbacks said electrical signal output from said optical transducer negatively to a base of said base-grounded transistor in said common base buffer.

8. The optical receiver of claim 7, further including a low-pass filter provided at least one of input and output of said offset compensator to pass low frequency components of said electrical signal.

* * * * *